Dec. 24, 1935. J. L. CREVELING 2,025,225
LUBRICATION DEVICE
Filed Sept. 17, 1931 4 Sheets-Sheet 1
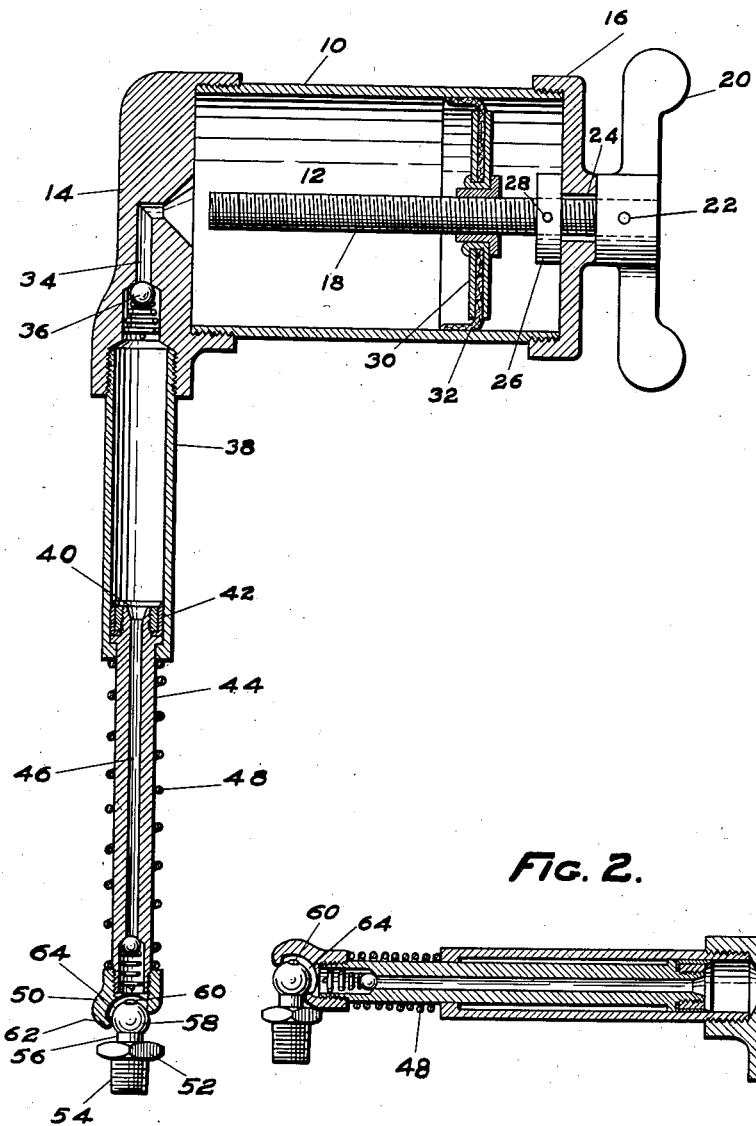
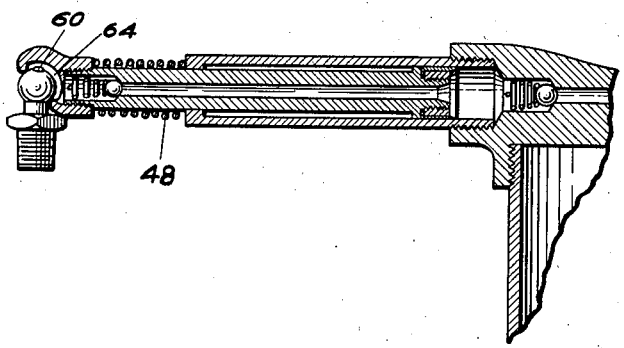
INVENTOR
JOHN L. CREVELING
BY
ATTORNEY Dec. 24, 1935.  J. L. CREVELING  2,025,225
LUBRICATION DEVICE
Filed Sept. 17, 1931  4 Sheets-Sheet 2
Fig. 3.
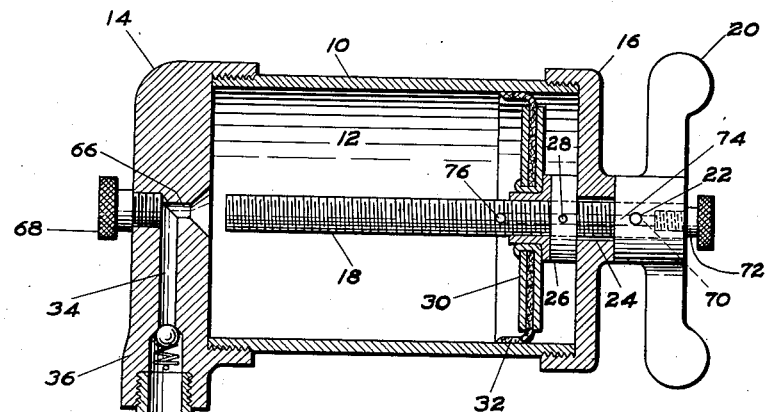
Fig. 4.
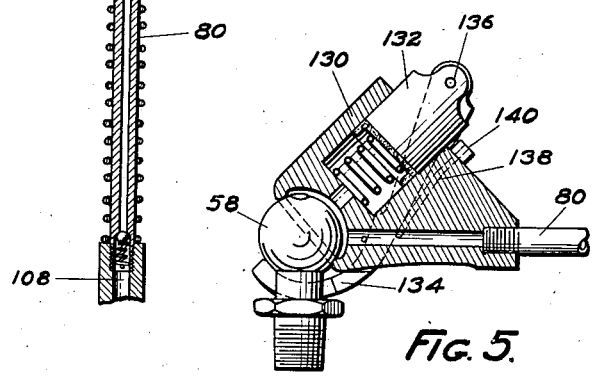
Fig. 5.
INVENTOR
JOHN L. CREVELING
BY
ATTORNEY Dec. 24, 1935. J. L. CREVELING 2,025,225
LUBRICATION DEVICE
Filed Sept. 17, 1931 4 Sheets-Sheet 3

INVENTOR
JOHN L. CREVELING
BY John A. Watson
ATTORNEY

Dec. 24, 1935.   J. L. CREVELING   2,025,225
LUBRICATION DEVICE
Filed Sept. 17, 1931   4 Sheets-Sheet 4

INVENTOR
JOHN L. CREVELING
BY
ATTORNEY

Patented Dec. 24, 1935

2,025,225

UNITED STATES PATENT OFFICE 2,025,225

LUBRICATION DEVICE

John L. Creveling, Tucson, Ariz., assignor to The Lubrication Corporation, South Bend, Ind., a corporation of Delaware Application September 17, 1931, Serial No. 563,401

18 Claims. (Cl. 285—91)

This invention relates to lubricating devices effective to deliver lubricants including oils and greases under pressure to a bearing or other place where lubricant is required through a so-called fitting or nipple, and more particularly to dispensers and means for connecting the dispensers with the fittings or nipples.

An object of the invention is to provide a portable lubricating gun in which the contained lubricant may be expelled from the gun under an initial pressure and the pressure acting on the lubricant may be increased or boosted to a high degree, if and when necessary, by the mechanical manipulation of the gun.

Another object of the invention is to provide a connection for a lubricant gun or other lubricant supply means which connection may have a universal movement in its application to a fitting, or in other words, a connection which may be used through a wide range of angular relationships with the fitting, and which will allow the gun or other lubricant supply means to be connected to the fitting in locations and positions that would be inaccessible with the ordinary types of coupling and fitting.

Another object of the invention is to provide lubricating devices of the character described so constructed that a single lubrication fitting may be adapted to installation in positions that are not readily accessible and which would ordinarily require specially designed fittings.

Another object of the invention is to provide a lubrication coupling which will form a fluid tight connection with a fitting during the lubricating operation.

A feature of the invention relates to the use of a small piston reciprocated in a cylinder by a thrust movement of a gun, lubricant being supplied to the cylinder from a lubricant reservoir forming a part of the gun.

Another feature of the invention lies in a coupling which may be so constructed as to increase the contact pressure on the fitting as the pressure on the lubricant is increased, thus insuring a tight joint under high pressure, the construction nevertheless permitting the coupling to be easily removed from the fitting when the pressure is relieved.

Other features and objects of the invention relating to details of construction of the gun and coupling will be apparent from the following description of certain embodiments which I have illustrated in the accompanying drawings, in which:

Figure 1 shows one form of lubricating gun constructed in accordance with my invention and illustrates an application of the invention to a gun of the contact type;

Figure 2 is a fragmentary view of the gun shown in Figure 1, illustrating the coupling and fitting positioned at right angles to each other;

Figure 3 is a view of a lubrication gun adapted for use with the clamp type of coupling;

Figure 4 is a form of coupling adapted for use in either type of gun, the figure showing the application of the coupling to a fitting with the gun at right angles thereto;

Figure 5 is a modified form of coupling having a clamping member operated by and hinged to a movable piston;

In general, all of the forms of guns shown in illustration of my invention have a common feature, in that each has a coupling formed with an annular contact surface or a circular line contact for the fitting, the surface or line being inclined to the axis of the gun. In some of the embodiments illustrated the contact is shown as a line and in others as an annulus. However, it is to be understood that both forms of contact are within the scope of my invention and that where either the term "contact surface" or the term "circular contact" is used in this specification and in the following claims, it is to be construed to cover a line contact as well as an annular contact. Each of the guns illustrated includes a high pressure portion comprising a pair of tubular telescoping members, the axis of these members specifically and of the gun in general, being along the line along which the gun is normally moved in its application to the fitting to be lubricated. The contact face, however, of the coupling is inclined to this axis, and therefore is inclined to the direction of application of force, so that the gun may be applied from substantially any direction. As shown, each of the contact faces makes an angle of substantially 45 degrees to the angle of application of the coupling to the fitting, and though this angle is preferable, yet other angles could be used. By the use of a coupling having a contact surface arranged at such an angle and by designing the proportions of the parts so that the diameter of the circular contact surface is almost as great as the diameter of the ball head of the fitting, it is possible to approach a fitting from any direction throughout a hemisphere or more and by a reversal of the fitting, it is possible to approach it from any direction whatsoever. By increasing the size of the circle which forms the contact surface, the ability to approach the fitting is increased greatly and therefore it is a feature of all the devices disclosed that the contact surface has a diameter nearly equal to the diameter of the ball head fitting. I am careful, however, that the diameter of the contact surface shall never be greater than the diameter of the fitting, inasmuch as such a design would prevent a lubricant tight seal. By the provision of a contact surface having a diameter nearly equalling the diameter of the ball head of the fitting, the ability to seal the contact of the coupling more tightly with the fitting is increased, due to the "infinite wedge" effect of the contact.

Figure 10:
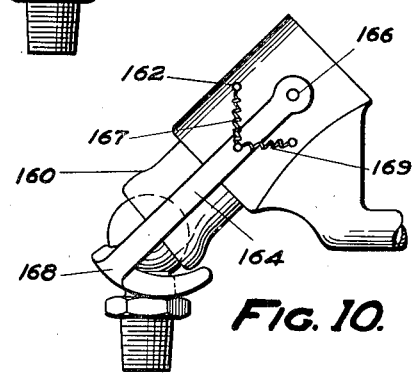
Figure 10 is another modified form of coupling having a yoke form of support hinged to the body of the coupling.

Referring to the drawings, and particularly to Figures 1 and 2, 10 generally denotes a grease gun having a cylindrical body 12, an end cap 14, and a cover 16, through which projects a threaded member 18, having a handle 20, secured thereto by a pin 22. Cover 16 has an opening 24 of somewhat larger diameter than threaded member 18, on which is a collar 26 secured thereto by pin 28. A piston 30, having a washer 32, is threaded on member 18 and has sufficient drag upon the sides of body 12 to be forced toward the cap member 14 when handle 20 is turned, and forces lubricant from the gun through the passageway 34 and past check valve 36 into the high pressure cylinder 38, which has threaded engagement with the cap 14. Within high pressure cylinder 38 is a piston 40, having a washer 42 and a plunger 44, having a lubricant conduit 46 formed therein. Plunger 44 is preferably of sufficient strength to withstand the thrust effort of the gun operator and is normally held in its outermost position by a spring 48 which coacts between the end of the cylinder 38 and coupling 50, which detachably contacts in thrust relation a fitting 52, having a threaded portion 54 for engagement with a member (not shown) to which the lubricant is to be supplied. Fitting 50 is preferably constructed with a neck portion 56 and a spherical head 58, through which is a lubricant opening closed by check valve 60. The contact portion of coupling 50 is preferably in the form of an annular area or circle 62, depending on the width of the surface arranged in a plane inclined to the axis of the plunger 44 and surrounds a lubricant space 64, which preferably extends around the ball head 58 for almost 180 degrees as viewed in the plane of Figures 1 and 2. The space 64 is preferably formed by under-cutting the coupling in a spherical form, so as to embrace a substantial portion of the ball area. Care should be taken to have the diameter of the contact area 62 less than the diameter of the ball 58, though I prefer as stated above, to have the diameter only slightly less. In the contact type of gun illustrated in Figures 1 and 2, the area of piston 40 should be greater than the area which would be enclosed by the annular contact area 62 on a plane passed through the circle formed by the outer edge of said area so that the thrust force exerted by the plunger 44 tending to force the fitting into contact with the ball, will be greater than the force exerted by the fluid pressure within the space 64, which tends to separate the coupling from the ball end of the fitting.

Figure 1 illustrates the piston in line with the fitting, and Figure 2 illustrates the gun at right angles to the fitting. Moreover, Figure 1 illustrates the gun in position to force lubricant into the fitting and Figure 2 illustrates the end of the thrust stroke. It may be noted in Figures 1 and 2, that the opening closed by check valve 60 is in communication with the lubricant space 64 for a total variation of approximately 180 degrees as viewed in the plane of the drawings, and that gun 10 may be rotated 360 degrees in a plane perpendicular to the plane of the drawings, or in other words, the gun is operative through a range of angles at least as great as all of the angles included by a hemisphere. It may also be noted that fitting 54 may be reversed with the ball head 58 projecting downwardly instead of upwardly, and that the gun will then be operative for the same amount of universal movement on the under side.

In the type of gun illustrated in Figure 3, an opening leading to the right angle passage 66 is closed by a plug 68, the opening being provided for venting the cylindrical body 12 when filling the gun. The threaded member 18 is formed with a central bore 70, normally closed by a plug 72 provided with a stem 74 and there is provided a lateral bore 76 connecting the bore 70 with the interior of the cylindrical body 12. Plugs 68 and 72 preferably are formed with knurled heads by which they may be easily screwed into and out of their respective openings. The gun illustrated in Figure 3 is similar in its major respects, to the type illustrated in Figures 1 and 2, except that it is especially designed for use with a clamp type of coupling. It is provided with a high pressure cylinder 78 and a plunger 80.

In the form of coupling shown in Figure 4, 100 is a cylindrical body portion closed by a threaded cap 102 and enclosing a piston 104 having a lubricant space 64 and an annular contact area 62. The piston is provided with a passageway 106 communicating with the space between the piston and plug 102, into which grease is supplied by a passageway 108 which is in communication with the plunger 80 of the lubricant gun. The side of the ball opposite to the piston is clamped by a bifurcated clamp member 109 secured to or formed integral with the casing 100. Piston 104 is preferably sealed by a washer 110 and if desired, spring 112 may be interposed between the piston and plug. As shown, the coupling of Figure 4 is connected with the plunger 80 of the lubricant gun shown in Figure 3. It is clear however that it could also be used advantageously when connected with a lubricant hose.

In the modification illustrated in Figure 5, the body portion 130 forms the contact portion and the piston 132 moves outwardly and carries with it the bifurcated support 134, which is hinged to the piston at 136. A spring 138 is secured to the body 130 by a screw 140 and resiliently holds the support or clamp 134 in contact with the ball when the pressure is relieved. The provision of the resiliently held support or clamp 134 allows the easy insertion of the ball head 58 of the fitting. By moving the coupling into contact with the ball head and especially into contact with the outer end of the clamp 134, the clamp may be moved downward and outward away from the body portion 130 so that the head 58 may be easily inserted in the socket. Thereupon the spring 138 moves the clamp 134 to the position shown in Figure 5, thus urging the ball head 58 more tightly into the socket. By this movement of the clamp 134, the outer end thereof which contacts with the ball head is moved beyond the dead center of the plunger 132 so that movement outward of the plunger 132, even though acting in combination with the spherical head of the fitting, has no tendency to cam the clamp 134 downward and thus has no tendency to cause the coupling to jump away from the ball head, but on the contrary, tends only to clamp the ball head 58 more securely in the coupling. The modification illustrated in Figure 5 can also be used advantageously with a lubricant hose.

Figure 6:
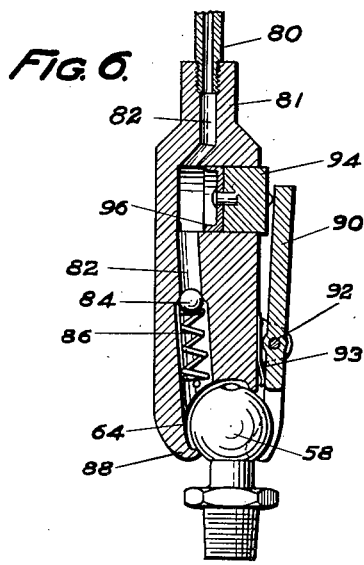
Figure 6 is another modified form of coupling adapted for use with either type of gun.
Figure 7:
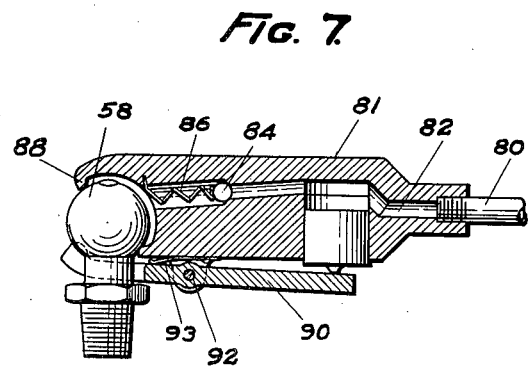
Figure 7 is another view of the coupling shown in Figure 6, and illustrating a right angle relation with reference to a fitting.

Another form of coupling adapted for use with the gun shown in Figure 3 and for use with a lubricant hose is illustrated in Figures 6 and 7, wherein the plunger 80 is secured to a coupling 81 through which is a lubricant passageway 82, communicating with a lubricant space 64 of substantially the same form and arrangement as the contact form of coupling illustrated in Figures 1 and 2. If desired, a check valve 84 may be incorporated, which in its normal position is held closed by a spring 86. A contact portion 88 of the coupling is not only held against the ball 58, by the thrust of the operator, but is also clamped thereto by a lever 90, pivotally secured to the contact member at 92, which may be resiliently urged to the open position by a spring 93. The spring, however, may be omitted, if desired. The lever 90 has its upper end engaging a piston 94 which has its inner end in communication with the lubricant passage 82, a washer 96 being preferably used to insure a fluid tight fit in the cylindrical opening in which it reciprocates. The upper end of the lever 90 may be, if desired, connected to the piston 94 as by a link. A spring may be inserted on the opposite side of the fulcrum for urging the lever 90 to the position shown, if desired. This form of coupling is automatic in closing as soon as pressure is supplied, because of lubricant pressure. It is automatic in opening because withdrawal of the pressure creates a suction which draws in the plunger 94 and allows the lever 90 to follow. The gun may thus be removed from the fitting whenever desired. In the operation of the gun shown in Figure 3, when used with the coupling shown in Figures 6 and 7, a thrust movement of the cylinder 78 will force lubricant through the plunger 80 and passageway 82 into the lubricant space 64 and at the same time will force piston 94 outwardly and cause the lower portion of lever 90 to grip the ball and support the fitting against disengagement. In Figure 7 is illustrated the method in which the coupling may approach the ball 58 from the side.

Figure 8:
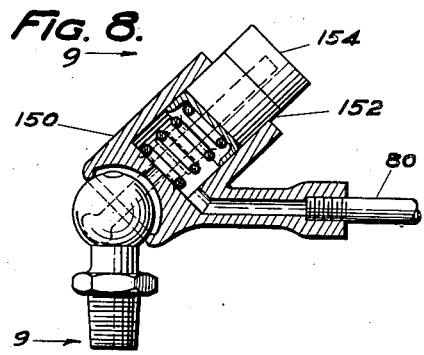
Figure 8 is another modified form of coupling having a pair of movable clamps hinged to the body and actuated by a piston.
Figure 9:
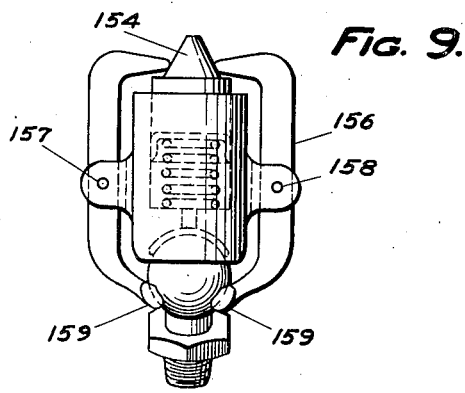
Figure 9 is a view of the coupling shown in Figure 8 taken in the direction of the arrows of Figure 8.

In the form shown in Figures 8 and 9, the body portion 150 is the contact portion within which reciprocates piston 152 having a wedge portion 154, engaging a pair of levers 156 hinged to the body 150 at 157 and 158, which have their end portions 159 engaging the ball on the side opposite to the contact portion.

Figure 11:
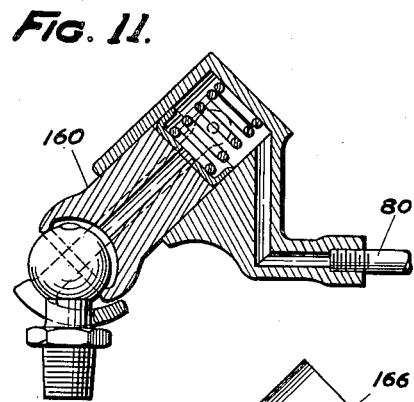
Figure 11 is a sectional view illustrating the coupling shown in Figure 10.

In the form shown in Figures 10 and 11, piston 160 forms the contact portion and the body portion 162 carries the clamp or support member 164 having the form of a yoke hinged to the opposite sides of the body at 166, and having a bifurcated end portion 168 adapted to grip the fitting opposite to the piston 160. If desired, means for locating or centering the yoke 164, such as springs 167 and 169 may be used. It is clear that if desired the support member 164 could be fixed and the end portion 168 could be hinged thereon.

Figure 12:
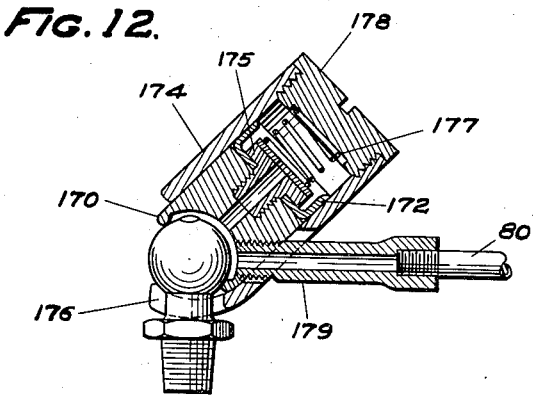
Figures 12, 13 and 14 are sections of modified forms of nozzle, clamping and sealing means operated by hydraulic pressure and adapted to be connected to a hand or power gun or to an ordinary pressure line.

In the form shown in Figure 12, piston 170 forms the contact portion and slides within a body portion 174, which carries an extension 176 for engaging the side of the ball opposite to the piston. The cylinder is closed by a plug member 178 and a washer 172 is preferably used to seal the joint between the cylinder and piston, the washer being secured to the piston by a threaded member 175, upon which the spring 177 is seated. The lubricant conduit 179 is secured into the piston and reciprocates therewith in a slot in the body portion 174.

Figure 13:
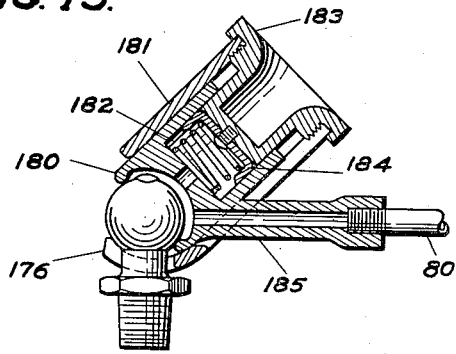

In the form shown in Fig. 13, piston 180 forms the contact portion and slides in the body portion 181. The piston has a recess 182 within which an extension on the closure plug 183 is received, the sealing washer 184 being secured to the extension on the closure plug. The body portion 181 is split throughout its length thus providing a slot in which the conduit 185 secured to the stem 80 may slide. The slot also allows the assembly of the piston 180 and the integral conduit 185 within the body portion 181.

Figure 14:
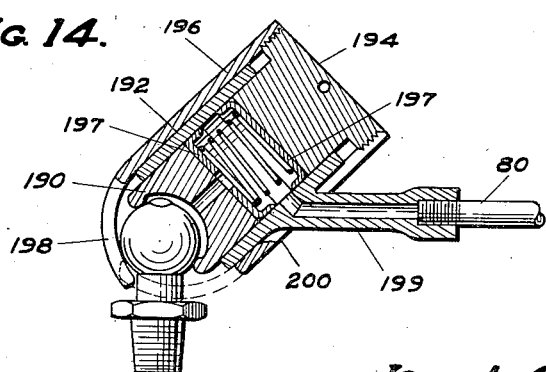

In the form shown in Fig. 14, the piston 190 forms the contact portion and is surrounded by a sleeve 192 which has a sliding relation with piston 190, the extension of closure plug 194 and also with the body 196 which carries the clamp member 198. In this form, both the closure plug 194 and the piston 190 are provided with sealing washers 197, and the grease conduit 199 may be formed integral with the sleeve 192 and slide relative to the other members within slot 200. The body 196 is split to form the slot 200 and to allow convenient assembly of the parts. If desired, the clamp member of this and other forms may be reversed, as shown in dotted lines in Fig. 14.

The couplings shown in Figs. 8–14 inclusive can be used with the gun shown in Fig. 3 and have been illustrated as connected to the plunger 80 thereof. However, they could also be used with a lubricant hose and are not intended to be limited in their use to the gun shown.

As stated above, the design of the various couplings so that the contact surface is inclined to the axis of the gun (shown inclined at 45 degrees) is especially valuable in that thereby it is possible to provide a universal coupling (i. e. to provide the coupling of the gun to the fitting at any angle of approach).

Thus it is possible to use a single type of fitting regardless of the position of the bearing which is to be lubricated, inasmuch as it is possible to approach this fitting from any angle. Moreover, it is possible to use fittings in which the inlet opening and/or valve are positioned exactly in the top of the head and thus it is possible to form the fitting more cheaply and with a single operation. I have stated above that I prefer to use a nozzle having a contact surface of a diameter only slightly less than the diameter of the ball head of the fitting, thus for a fitting having a ball head of a diameter of .3125, the contact surface of the nozzle may be formed with a tool having an external diameter of .305 inch. Thus the diameter of the contact surface may be approximately .305 inch plus tolerance. In addition to this, I prefer to lap the edges of the contact surface so as to correspond to the contour of the ball head of the fitting, thus increasing the diameter over that specified above.

While I have illustrated and described certain embodiments of my invention, it is to be understood that this showing and description are illustrative only, and that I do not regard the invention as limited to the forms illustrated and described, or otherwise, except by the terms of the following claims.

I claim:

1. In a lubricating device, a coupler adapted to be thrust against a ball headed fitting for servicing the fitting comprising a casing, and a plunger in said casing having a face for contacting with the ball head of the fitting said face being inclined to the direction of thrust of said plunger.

2. A lubricating coupling comprising a body portion having an area adapted to contact a fitting and surrounding a lubricant space, a cylinder communicating with said space, a piston in said cylinder, a pair of levers hinged to the body portion adapted to grip a fitting, and means on the piston for forcing the gripping portions of the levers toward each other.

3. A lubricating coupling comprising a body portion having an area adapted to contact a fitting and surrounding a lubricant space, a cylinder communicating with said space, a piston in said cylinder, a pair of levers hinged to the body portion adapted to grip a fitting, and a wedge actuated by the piston for forcing the gripping portions of the levers toward each other.

4. A lubricating coupling comprising a piston having a contact area surrounding a grease space and adapted to contact with a spherical headed fitting, said space being greater in diameter than one-fourth the diameter of the fitting, a cylinder in communication with said space enclosing said piston, and a support member hinged to the cylinder and cooperating with the piston to grip said fitting when fluid pressure is applied to the cylinder.

5. A lubricating coupling comprising a piston having an area surrounding a grease space and adapted to contact with a fitting, a cylinder in communication with said space enclosing said piston, and a yoke hinged to opposite sides of the cylinder and adapted to grip said fitting when fluid pressure is applied to the space.

6. A lubricating coupling comprising a cylindrical member, a piston member exposed to lubricant pressure and slidably mounted in said cylindrical member, and a clamp jaw hingedly connected to one of said members adapted to contact with a fitting on one side thereof, the other said member having a contact area surrounding a lubricant space adapted to contact with the fitting head on the side thereof opposite to the clamp jaw contact and to embrace greater than one-fourth the area of the fitting head.

7. In a lubricating device a coupler for servicing a lubrication fitting comprising a casing, said casing having a jaw for engaging with the head of said fitting, a member slidably mounted in said casing, means positioned within said casing for urging said member toward the head of the fitting and means for manually moving said member away from said head.

8. A lubricating coupling comprising a piston adapted to contact with a fitting and having an opening formed therethrough, a body portion forming a cylinder for the piston, an extension on the body portion extending beyond the piston and adapted to grip the fitting on the opposite side thereof from the piston, and a lubricant conduit secured to the piston and movable therewith and having communication with the opening through the piston whereby fluid pressure is communicated between the piston and cylinder to force them apart and grip the fitting between the piston and extension.

9. A lubricant delivery nozzle for making a fluid-tight connection with a lubricant receiving fitting having a spherical portion greater than a hemisphere comprising, a member having a lubricant inlet passageway therethrough and a pocket recess at the outer end of said passageway, said pocket recess being surrounded by an annular sealing surface of substantial width and of a diameter at its mean plane substantially equal to the diameter of the said spherical portion of said fitting, said sealing surface forming the mouth of said pocket recess and lying substantially at the end of said member, the mean plane of said surface being inclined at an acute angle to the axis of said passageway.

10. In a lubricating device, a connector for servicing a ball headed lubrication fitting comprising a rigid nozzle having an axial bore and an annular contact face for sealing engagement with the fitting and whose effective diameter is less than but substantially equal to the diameter of said ball headed fitting, the mean plane of said annular contact face lying at an acute angle to the axis of the bore of the nozzle.

11. In a lubricating device, a connector for servicing a metal ball headed lubrication fitting comprising a nozzle including a rigid tubular member and an annular metal contact face for metal to metal sealing engagement with the fitting, said annular face defining a socket the walls of which are spaced from the fitting head and the mean plane of said annular face lying in a plane at an acute angle to the axis of said tubular member.

12. In a lubricating device, a coupler for servicing a ball headed lubrication fitting comprising a nozzle, an inlet tube connected to said nozzle, said nozzle including a jaw for engaging the head of the fitting and a socket communicating with said inlet tube and having at its mouth an annular contact face for sealing engagement with the head of the fitting, and a pressure responsive plunger for moving the jaw and socket relatively toward each other to clamp the fitting head therebetween, the mean plane of said annular contact face being at an acute angle to the axis of said inlet tube.

13. In a lubricating device, a connector for servicing a ball headed lubrication fitting comprising a nozzle including a rigid tubular member and an annular contact face for sealing engagement with the fitting head, the effective diameter of said annular contact face being less than but substantially equal to the diameter of the fitting head and the mean plane of said annular face lying at an acute angle to the axis of said tubular member.

14. In a lubricating device, a coupler for servicing a ball headed fitting comprising a nozzle, an inlet tube connected to said nozzle, said nozzle including a jaw for engaging the head of the fitting and a socket communicating with said tube and having an annular edge for sealing engagement with the head of the fitting, the effective diameter of said annular edge being less than but substantially equal to the diameter of the fitting head and the mean plane of said annular edge lying at an acute angle to the axis of the inlet tube, and means responsive to lubricant pressure in said inlet tube for urging said jaw and socket relatively toward each other to clamp the fitting head therebetween.

15. Means for making a quick detachable fluid tight connection with a fluid receiving fitting having a spherical portion greater than a hemisphere comprising, a member having a sealing surface for making a sealing contact with said portion, said sealing surface having a zone embracing and contacting with said spherical portion substantially at a diameter thereof, the said contact zone being at an acute angle to the main axis of said member.

16. Means for making a quick detachable fluid tight connection with a fluid receiving fitting having a spherical portion greater than a hemisphere comprising a member having a sealing surface for making a sealing contact with said portion, said sealing surface having a zone embracing and contacting with said spherical portion substantially at a diameter thereof, the said contact zone being at an angle of approximately 45 degrees to the main axis of said member.

17. In a lubricating device, a coupler for servicing a ball headed fitting comprising a casing, an inlet tube connected to said casing, a jaw on said casing for engaging with the head of said fitting, and a rigid plunger slidably mounted in said casing, said plunger having an integral annular face for contacting with the ball head of said fitting substantially at a diameter thereof, the mean plane of said face inclined at other than 90 degrees to the axis of said inlet tube.

18. In a lubrication device, a coupler for servicing a ball headed fitting comprising a nozzle including a pressure cylinder, a socket and a clamping jaw, an inlet tube connected to said nozzle, said socket communicating with said inlet tube and having an annular edge far sealing engagement with the fitting head, the mean plane of said annular edge lying at an acute angle to the axis of the inlet tube, a piston in said pressure cylinder and connections between said piston and said clamping jaw whereby the clamping jaw will be urged toward the socket in response to pressure in the inlet tube.

JOHN L. CREVELING.